May 13, 1958 P. N. NELSON 2,834,370
FLOAT VALVE CONSTRUCTION
Filed July 18, 1957
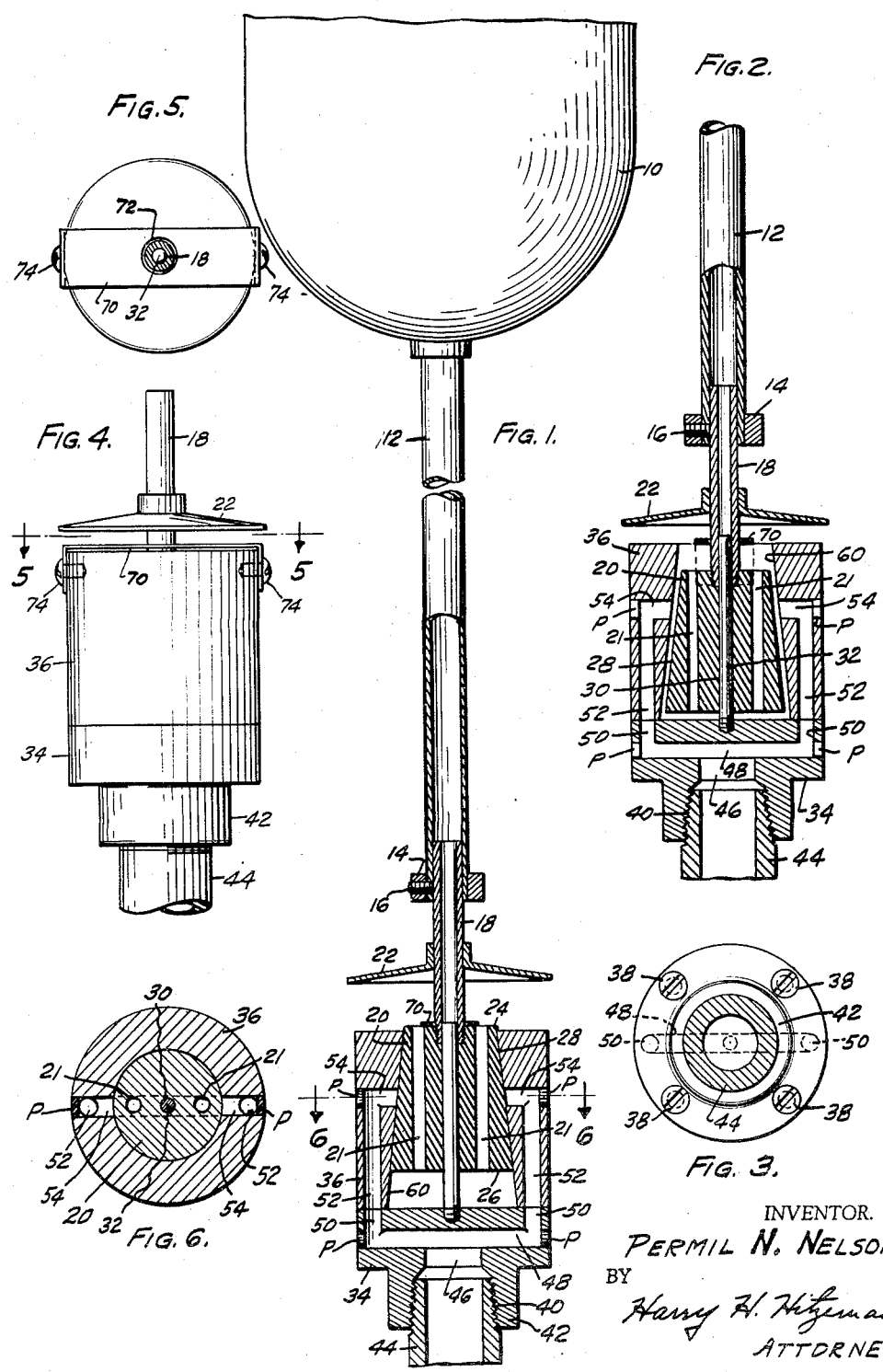
INVENTOR.
PERMIL N. NELSON
BY
Harry H. Hitzeman
ATTORNEY.

United States Patent Office 2,834,370
Patented May 13, 1958

2,834,370

FLOAT VALVE CONSTRUCTION

Permil N. Nelson, Galesburg, Ill., assignor to Lynn H. Ewing, doing business as Black Hawk Company, Rock Island, Ill.

Application July 18, 1957, Serial No. 672,675

3 Claims. (Cl. 137—433)

My invention relates to improvements in valve construction.

My invention relates more particularly to improvements in float operated inlet valves of the general type that are used in water reservoirs of flush toilets. These valves are of the type which are opened when a toilet is flushed and permit water to enter the reservoir to a level determined by a float ball which usually operates through connected mechanism with a valve and port in the water inlet line from the plumbing system of the building.

The principal object of my invention is to provide a comparatively simple yet highly efficient float operated inlet valve for water reservoirs of flush toilets.

A further object of the invention is to provide a tapered or plug valve and cage which is so constructed that its operation to open or close is unaffected by the water pressure either above or below the same and capable of easy and positive operation by a minimum of movement of a ball float or other operating mechanism.

A further object of the invention is to provide a valve of the type described that is made of a minimum number of parts, each easily made in mass production, capable of quick assembly and subject to long and hard use without becoming broken or out of order.

Other objects and advantages will be more apparent from the following description wherein reference is had to the accompanying drawing upon which Fig. 1 is a side elevation view of my improved float valve construction with the plug valve and cage parts shown in cross-section with the valve in a closed position;

Fig. 2 is a cross-sectional view through the plug valve and cage parts showing the valve in an open position;

Fig. 3 is a bottom plan view;

Fig. 4 is a side elevational view of the plug valve and cage assembly separated from the float and float stem;

Fig. 5 is a plan sectional view taken on the line 5—5 of Fig. 4; and

Fig. 6 is a plan sectional view taken on the line 6—6 of Fig. 1.

In the embodiment of the invention which I have chosen to illustrate and describe the same, I provide a construction which may include a hollow ball 10 of the usual type used in water reservoirs for flush toilets connected to the upper end of a hollow stem 12.

I provide a collar 14 secured at the lower end of the stem 12, the collar being provided with a screw member 16 for fastening the stem 12 at a desired point to a short stem member 18 that is screw-threadedly connected at its lower end in a tapped opening in the upper end of a plug valve 20. I also mount a circular splash-hood 22 on the stem 18 by welding or otherwise.

The valve plug 20 may be a tapered cylindrical member having an upper end 24 and a lower end 26 and a tapered exterior wall 28. It may also have an axial bore 30 to slidingly receive a fixed guide stem 32 that is screw-threadedly mounted at its lower end in the base 34 of the valve cage or housing.

The valve cage or housing may be formed of the base 34 and the upper housing portion 36, both cylindrical in shape and fastened together by countersunk head screws 38 which pass through the base 34 into the body of the upper housing 36. Base 34 may have a screw-threaded opening 40 in a downwardly depending flange 42 to receive the end of an inlet conduit 44. The base 34 also has a bore 46 in communication with the inlet pipe 44, the bore 46 communicating with the cross passageway 48. The passageway 48 communicates with a pair of vertical passageways 50 that are aligned with continuing passageways 52 in the side walls of the upper housing member 36.

The upper housing 36 may also have a pair of cross passageways 54 adjacent the top end of the same forming ports that communicate with the open-ended frustoconically shaped chamber 60, in which the plug valve 20 is adapted to operate, adjacent the top of the same.

I provide a cushioning limit stop for upward movement of the valve plug 20 in the nature of a flat brass spring member 70, the same having a medial opening 72 about the stem 18 and being fastened on the sides of the upper housing 36 by a pair of round-head screws, 74. In the making of the passageways 48 and 54 I preferably drill straight through the base 34 and upper housing 36 and provide sealing plugs P to close the openings in the wall.

In operation, as shown in Fig. 1, the plug valve 20 is in a raised position in the chamber 60 with the brass spring limit stop 70 slightly sprung upwardly to permit sealing of the valve, the valve being held in the upper position shown by the action of the level of the water in raising the hollow ball 10. In this position the valve ports in passageways 54 are closed. Water under pressure may be in the inlet pipe 44, the passageways 48, 50 and 54. When a toilet is flushed, as for example, when the outlet valve of the water reservoir is opened and the level of the water descends, the weight of the hollow ball 10, its stem 12 and the plug valve 20 will drop the valve 20 by gravity to the position shown in Fig. 2, leaving a passageway for water under pressure to flow from the inlet conduit 44 upwardly through the passageways 48, 52, and through the ports at the inner ends of passageways 54 and out through the upper end of the valve chamber 60 around the plug valve 20. When sufficient flushing water has thus been introduced in the water reservoir through the valve chamber 60, the ball float 10 will again be raised to the position shown in Fig. 1, the plug valve 20 will be raised and the ports at the inner ends of passageways 54 will be closed.

It will be noted that the plug valve 20 has a pair of vertical passageways 21 between the top and bottom of the same, these passageways being for the purpose of permitting any water which may enter the lower end of the chamber 60 to pass upwardly therethrough.

With this construction the plug valve 20 is subject only to movement by vertical movement of the hollow ball 10, the line pressure in the plumbing system not affecting in any way either the raising or lowering of the plug valve, since at no time can any water be trapped in the valve chamber 60.

From the above and foregoing description it can be seen that I have provided a highly efficient and easily operable inlet valve subject to movement only by the action of the float ball 10. This action will take place regardless of the amount of pressure in the inlet conduit 44 or the level to which it is desired to raise the water in the reservoir. The telescoping stems 12 and 18 and the collar 16 permit adjustment of the float 10 within limits to raise or lower the water level as desired. The splash-hood 22 prevents unusual turbulence around the outlet from the valve chamber 60 and tends to create a smooth and efficient operation of the valve structure.

While I have illustrated and described a specific embodiment of the invention, it will be apparent to those skilled in the art that changes and improvements may be made in the exact details shown and I do not wish to limit myself in any particular, rather what I desire to secure and protect by Letters Patent of the United States is:

1. A float operated valve comprising a cylindrically shaped valve housing having a bottom wall, side walls and a frusto-conically shaped chamber in said housing having an open upper end, an inlet conduit connected to the lower end of said bottom wall to support said housing thereon, said bottom wall and housing having passageways therein communicating with said inlet conduit and with ports in said chamber wall near its open upper end, a tapered plug valve reciprocal in said frusto-conically shaped chamber, said plug valve being of a size slightly smaller than said frusto-conically shaped chamber, a stem extending upwardly therefrom, a float ball connected to the upper end of said stem, said plug valve closing the ports in said chamber wall in raised position and opening the same when said float ball is lowered.

2. A float operated valve comprising a cylindrically shaped valve housing having a bottom wall, side walls and a frusto-conically shaped chamber in said housing having an open upper end, an inlet conduit connected to the lower end of said bottom wall to support said housing thereon, said bottom wall and housing having passageways therein communicating with said inlet conduit and with ports in said chamber wall near its open upper end, a vertical guide post mounted on the bottom wall of said housing medially of said chamber, a tapered plug valve reciprocal on said guide post in said frusto-conically shaped chamber, said plug valve being of a size slightly smaller than said frusto-conically shaped chamber, a stem extending upwardly therefrom, a float ball connected to the upper end of said stem, said plug valve closing the ports in said chamber wall in raised position and opening the same when said float ball is lowered, said plug valve having passageways to permit water in said chamber under said valve to flow out of said chamber.

3. A float operated valve comprising a cylindrically shaped valve housing having a bottom wall, side walls and a frusto-conically shaped chamber in said housing, having an open upper end, an inlet conduit connected to the lower end of said bottom wall to support said housing thereon, said bottom wall and housing having passageways therein communicating with said inlet conduit and with ports in said chamber wall near its open upper end, a vertical guide post mounted on the bottom wall of said housing medially of said chamber, a tapered plug valve reciprocal on said guide post in said frusto-conically shaped chamber, said plug valve being of a size slightly smaller than said frusto-conically shaped chamber, a stem extending upwardly therefrom, a float ball connected to the upper end of said stem, said plug valve closing the ports in said chamber wall in raised position and opening the same when said float ball is lowered, said plug valve having passageways to permit water in said chamber under said valve to flow out of said chamber, said passageways extending vertically through said plug valve.

References Cited in the file of this patent

UNITED STATES PATENTS

| 190,044 | Iffland | Apr. 24, 1877 |
| 752,314 | Tozier | Feb. 16, 1904 |
| 876,867 | Duggan | Jan. 14, 1908 |
| 1,423,679 | Pavitchich | July 25, 1922 |
| 1,477,916 | Sikes et al. | Dec. 18, 1923 |
| 2,240,560 | King et al. | May 6, 1941 |